US011949954B2

(12) United States Patent
Bonvolanta et al.

(10) Patent No.: US 11,949,954 B2
(45) Date of Patent: *Apr. 2, 2024

(54) METHODS AND APPARATUSES FOR A MODULAR AND EXTENSIBLE ADVERTISEMENT REQUEST

(71) Applicant: AT&T Intellectual Property I, L.P., Atlanta, GA (US)

(72) Inventors: Anthony F. Bonvolanta, Chicago, IL (US); Roland N. Noll, San Antonio, TX (US); Scott G. Crawford, Columbus, NJ (US); Steven Plesnarski, Edison, NJ (US); Hans J. Fischmann, Wellesley, MA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/969,162

(22) Filed: Oct. 19, 2022

(65) Prior Publication Data

US 2023/0043625 A1 Feb. 9, 2023

Related U.S. Application Data

(63) Continuation of application No. 17/412,434, filed on Aug. 26, 2021, now Pat. No. 11,509,960, which is a
(Continued)

(51) Int. Cl.
*H04N 21/458* (2011.01)
*H04N 21/234* (2011.01)
(Continued)

(52) U.S. Cl.
CPC ..... *H04N 21/458* (2013.01); *H04N 21/23424* (2013.01); *H04N 21/47815* (2013.01); *H04N 21/812* (2013.01)

(58) Field of Classification Search
CPC .......... H04N 21/23424; H04N 21/458; H04N 21/47815; H04N 21/812; G06Q 30/0251
See application file for complete search history.

(56) References Cited

U.S. PATENT DOCUMENTS 5,411,493 A * 5/1995 Rodriguez ................ A61F 7/02
604/290
6,423,047 B1 * 7/2002 Webster ................ A61F 13/505
604/397

(Continued)

OTHER PUBLICATIONS

Linderoth, Martin , "Dynamic Ad Insertion in Linear and VOD OTT Streams", <https:medium.com/tele2techblog/dynamic-ad-insertion-in-linear-and-vod-ott-streams-6be96270f88b>, Oct. 29, 2018, 6 pages.

*Primary Examiner* — Michael B. Pierorazio
(74) *Attorney, Agent, or Firm* — Guntin & Gust, PLC; Mark Wilinski

(57) ABSTRACT

Aspects of the subject disclosure may include, for example, transmitting a first request that includes a key, wherein the key identifies: a processing system that is a targeted recipient of an advertisement, a stream in which a primary content item is being provisioned to the processing system, and a service provider, based at least in part on the transmitting of the first request, obtaining information pertaining to an advertisement from a device of the service provider, and inserting the information within a portion of the stream corresponding to a break in the primary content item. Other embodiments are disclosed.

20 Claims, 9 Drawing Sheets

Related U.S. Application Data continuation of application No. 16/786,226, filed on Feb. 10, 2020, now Pat. No. 11,134,311.

(51) Int. Cl.
*H04N 21/478* (2011.01)
*H04N 21/81* (2011.01)

(56) References Cited

U.S. PATENT DOCUMENTS

| | | | |
|---|---|---|---|
| 6,982,780 B2 * | 1/2006 | Morley | H04N 21/41415 |
| | | | 352/38 |
| 8,483,393 B2 * | 7/2013 | Robert | H04N 21/63345 |
| | | | 380/278 |
| 8,713,603 B2 | 4/2014 | Kilar et al. | |
| 11,134,311 B2 * | 9/2021 | Bonvolanta | G06Q 30/0251 |
| 2002/0121273 A1 * | 9/2002 | Nyilas | A41D 13/1245 |
| | | | 128/99.1 |
| 2003/0149975 A1 | 8/2003 | Eldering et al. | |
| 2004/0088737 A1 * | 5/2004 | Donlan | H04N 7/165 |
| | | | 725/135 |
| 2007/0294710 A1 * | 12/2007 | Meesseman | H04L 41/22 |
| | | | 719/328 |
| 2007/0294734 A1 * | 12/2007 | Arsenault | H04N 21/25875 |
| | | | 725/87 |
| 2008/0114880 A1 * | 5/2008 | Jogand-Coulomb | H04L 61/30 |
| | | | 709/227 |
| 2008/0194276 A1 * | 8/2008 | Lin | H04L 61/5014 |
| | | | 455/466 |
| 2008/0270462 A1 * | 10/2008 | Thomsen | G06F 16/2471 |
| 2009/0133090 A1 * | 5/2009 | Busse | H04N 21/4755 |
| | | | 725/132 |
| 2009/0150941 A1 | 6/2009 | Riedl et al. | |
| 2010/0021512 A1 * | 1/2010 | Arron | A61L 15/46 |
| | | | 424/404 |
| 2010/0138297 A1 * | 6/2010 | Fitzgerald | G06Q 30/0255 |
| | | | 715/764 |
| 2010/0138298 A1 * | 6/2010 | Fitzgerald | H04L 63/10 |
| | | | 705/14.58 |
| 2010/0299264 A1 * | 11/2010 | Berger | G06Q 30/0601 |
| | | | 705/59 |
| 2012/0124618 A1 | 5/2012 | Ruiz-Velasco et al. | |
| 2013/0175333 A1 * | 7/2013 | Gilbert | H04N 21/41407 |
| | | | 235/375 |
| 2014/0373041 A1 * | 12/2014 | Yan | H04N 21/4627 |
| | | | 725/27 |
| 2020/0084486 A1 * | 3/2020 | Cho | G06F 21/335 |
| 2021/0250648 A1 | 8/2021 | Bonvolanta et al. | |
| 2021/0392400 A1 | 12/2021 | Bonvolanta et al. | |

* cited by examiner

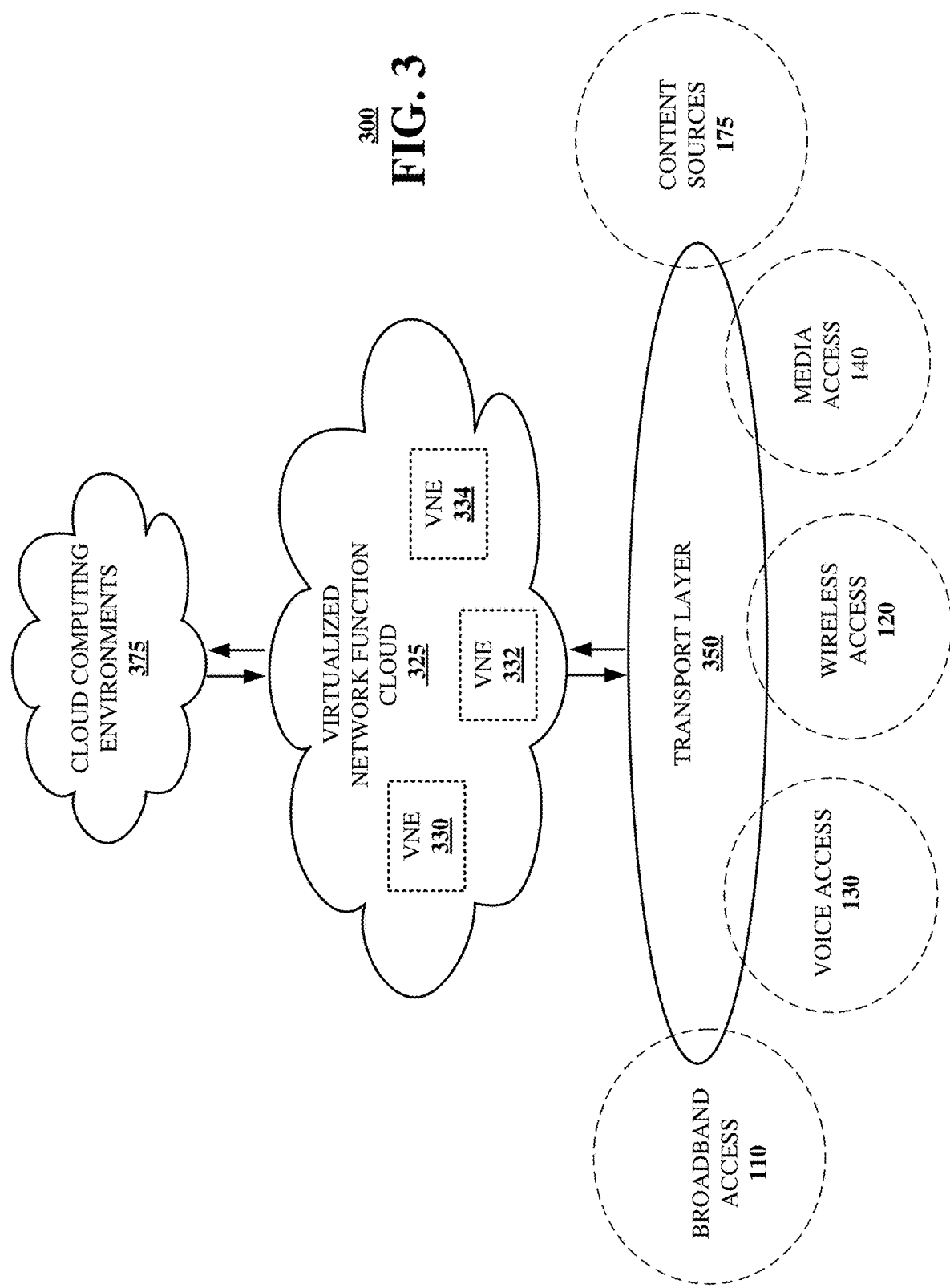

METHODS AND APPARATUSES FOR A MODULAR AND EXTENSIBLE ADVERTISEMENT REQUEST

CROSS-REFERENCE TO RELATED APPLICATIONS

This application is a continuation of U.S. patent application Ser. No. 17/412,434 filed Aug. 26, 2021, which is a continuation of U.S. patent application Ser. No. 16/786,226 filed Feb. 10, 2020 (now U.S. Pat. No. 11,134,311). All sections of the aforementioned application are incorporated herein by reference in their entirety.

FIELD OF THE DISCLOSURE

The subject disclosure relates to methods and apparatuses for a modular and extensible advertisement request.

BACKGROUND

As the world becomes increasingly connected through vast networks and various communication devices, additional opportunities are generated for providing content to users. For example, such content may include advertisements that help to defray the cost of creating and providing/distributing other content (e.g., movies, programs, music, books, etc.).

In order to facilitate a delivery of advertisements to a client (e.g., a client application, a client device, etc.), the client is provided an ability to link/connect to a specific vendor/service provider. However, in such an instance the client must have specific information on how the vendor operates (e.g., must possess proprietary information associated with the vendor). This effectively creates a 1-to-1 relationship between the client and the vendor in terms of, e.g., client-generated advertisement requests. For example, the client must handle/manage the information for each of the respective vendors that may potentially be utilized to facilitate directing an advertisement request to a particular vendor. Additionally, there is an education/training burden when a new vendor is introduced—e.g., the client must learn of the new vendor and obtain the information associated with the new vendor.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for requesting and obtaining secondary content items to one or more primary content items. Other embodiments are described in the subject disclosure.

One or more aspects of the subject disclosure include obtaining a first request that includes a key, identifying, in accordance with the key, a client associated with the first request and a vendor associated with the first request, obtaining a list of services associated with the client, the vendor, or a combination thereof, processing the list of services to generate a service request, transmitting the service request to a server of the vendor, responsive to the transmitting of the service request, obtaining information pertaining to an advertisement, and responsive to the obtaining of the information pertaining to the advertisement, transmitting the information pertaining to the advertisement.

One or more aspects of the subject disclosure include transmitting a first request that includes a key, wherein the key identifies: a processing system that is a targeted recipient of an advertisement, a stream in which a primary content item is being provisioned to the processing system, and a service provider, based at least in part on the transmitting of the first request, obtaining information pertaining to an advertisement from a device of the service provider, and inserting the information pertaining to the advertisement within a portion of the stream corresponding to a break in the primary content item.

One or more aspects of the subject disclosure include transmitting a first request that identifies a video, receiving a first portion of the video from a first server via a streaming transport mechanism, presenting the first portion of the video via a display screen and a speaker, identifying a break in a playback of the video between the first portion of the video and a second portion of the video that is subsequent to the first portion in the playback, transmitting a second request that includes a first identification of the processing system and a second identification of a vendor that provides a plurality of advertisements, responsive to the transmitting of the second request, receiving information pertaining to an advertisement included in the plurality of advertisements prior to the break, obtaining the advertisement in accordance with the information pertaining to the advertisement, and responsive to the obtaining of the advertisement, presenting the advertisement via the display screen and the speaker at a point in time in the playback corresponding to the break.

Figure 1:
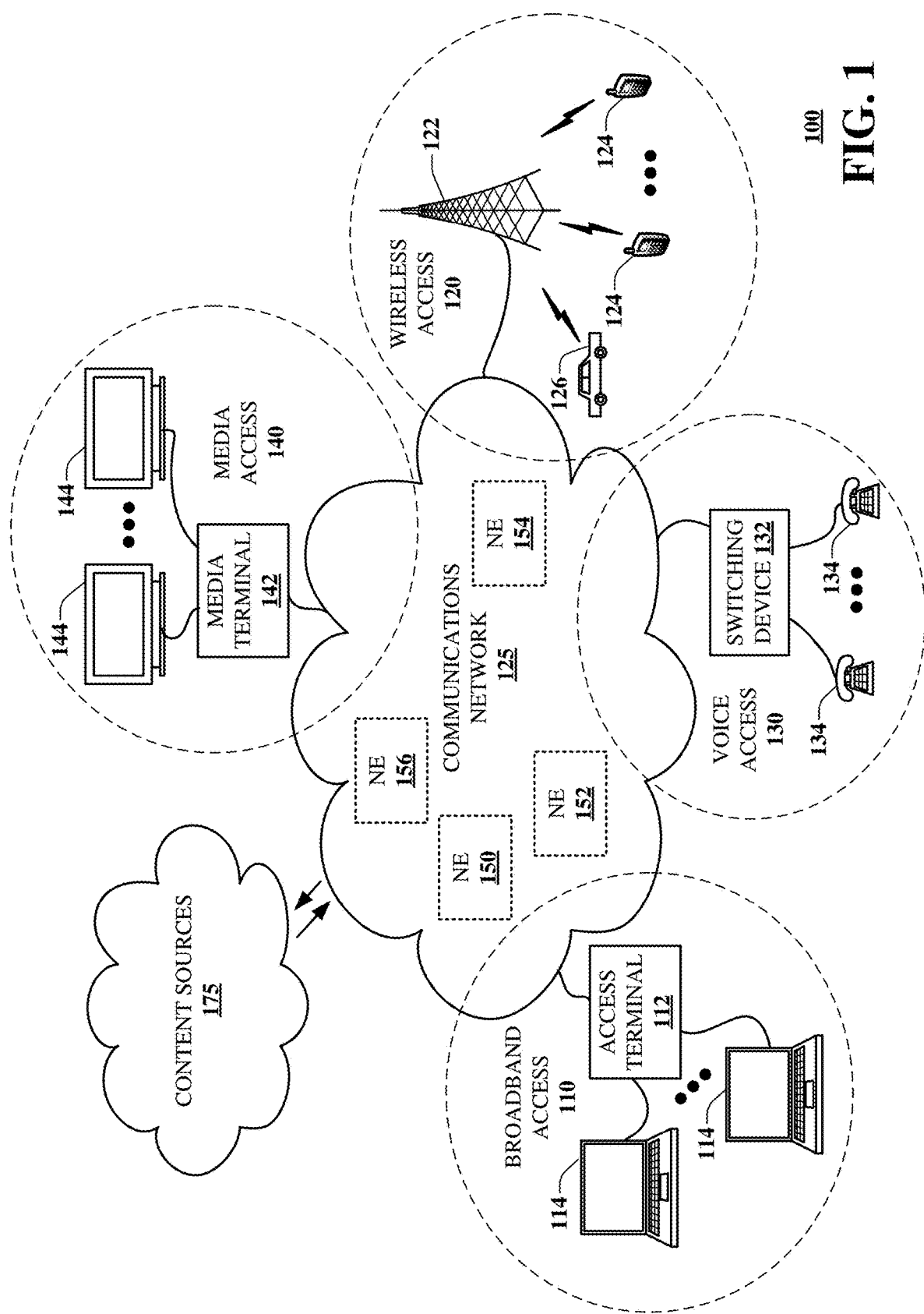
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part obtaining a first request that includes a key, identifying, in accordance with the key, a client associated with the first request and a vendor associated with the first request, obtaining a list of services associated with the client, the vendor, or a combination thereof, processing the list of services to generate a service request, transmitting the service request to a server of the vendor, responsive to the transmitting of the service request, obtaining, from the server of the vendor, information pertaining to an advertisement, and responsive to the obtaining of the information pertaining to the advertisement, transmitting the information pertaining to the advertisement. System 100 can facilitate in whole or in part transmitting a first request that includes a key, wherein the key identifies: a processing system that is a targeted recipient of an advertisement, a stream in which a primary content item is being provisioned to the processing system, and a service provider, based at least in part on the transmitting of the first request, obtaining information pertaining to an advertisement from a device of the service provider, and inserting the information pertaining to the advertisement within a portion of the stream corresponding to a break in the primary content item. System 100 can facilitate in whole or in part transmitting a first request that identifies a video, receiving a first portion of the video from a first server via a streaming transport mechanism, presenting the first portion of the video via a display screen and a speaker, identifying a break in a playback of the video between the first portion of the video and a second portion of the video that is subsequent to the first portion in the playback, transmitting a second request that includes a first identification of the processing system and a second identification of a vendor that provides a plurality of advertisements, responsive to the transmitting of the second request, receiving information pertaining to an advertisement included in the plurality of advertisements prior to the break, obtaining the advertisement in accordance with the information, and presenting the advertisement via the display screen and the speaker at a point in time in the playback corresponding to the break.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices. In some embodiments, the display devices 144 may be included/integrated as part of a tablet, a personal computer (PC), a phone (e.g., a smartphone), etc.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
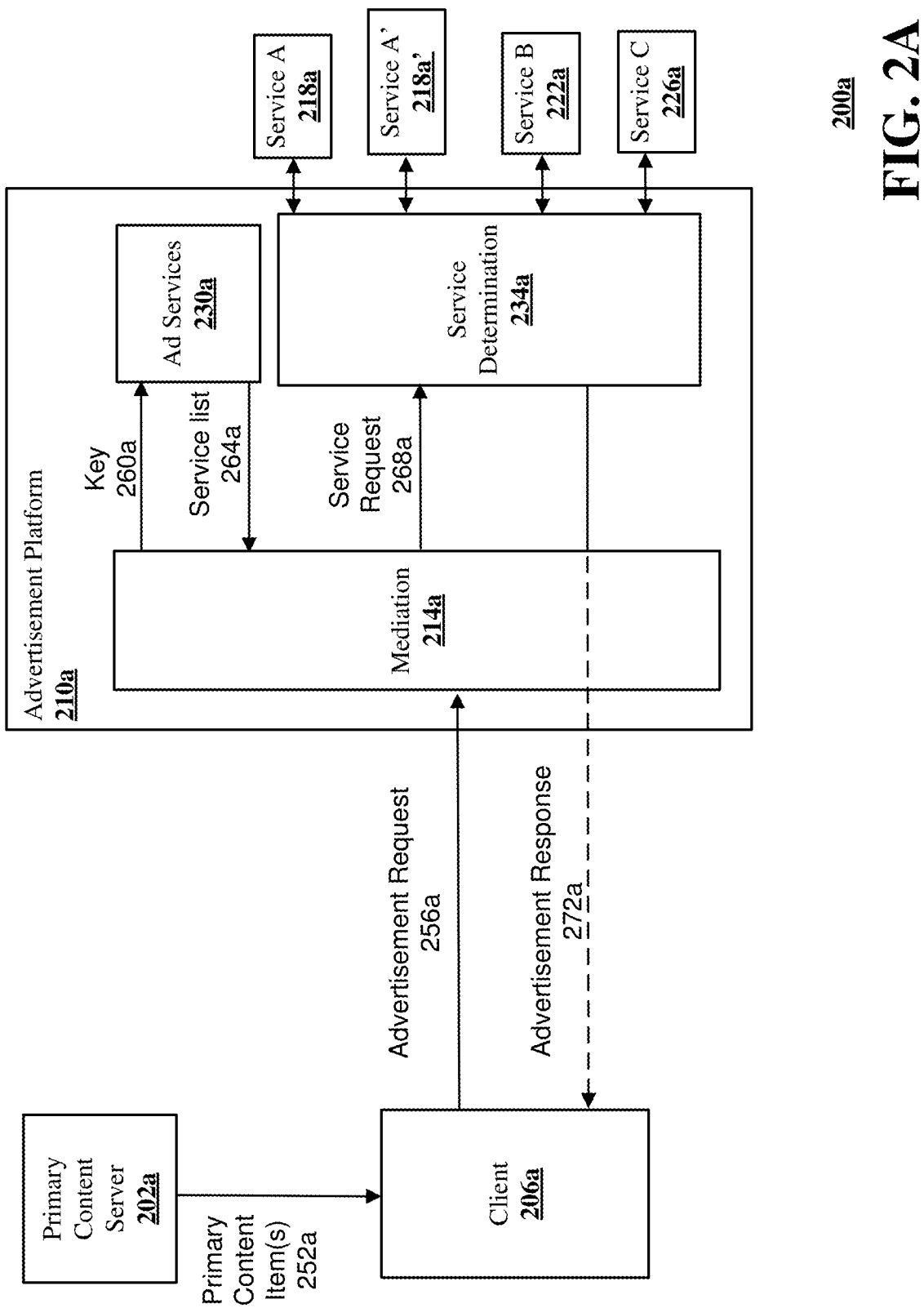
FIGS. 2A-2C are block diagrams illustrating example, non-limiting embodiments of systems functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. As described in further detail below, the system 200a may facilitate an insertion/incorporation of one or more secondary content items (e.g., advertisements) with respect to a given primary content item (e.g., a movie, a television program, music, a document, a news article, etc.). In particular, and for reasons that will become clearer below, the system 200a may facilitate client-side secondary content item insertion.

The system 200a may include one or more primary content servers, such as for example a primary content server 202a. The primary content server 202a may provide one or more primary content items 252a to a client 206a. The provisioning of a primary content item 252a to the client 206a may adhere to a pull model, whereby the client 206a requests the primary content item 252a. For example, the client 206a may request the primary content item 252a based on navigating one or more menus, electronic programming guides (EPGs), interactive programming guides (IPGs), websites (potentially as part of a search request), etc. In some embodiments, the provisioning of a primary content item 252a to the client 206a may adhere to a push model, whereby the primary content server 202a sends the primary content item 252a to the client 206a without requiring an explicit/affirmative request for the primary content item 252a from, e.g., the client 206a. In accordance with the push model, the primary content item 252a may be selected in accordance with one or more criteria, such as for example an analysis of a log/record of consumed media by the client 206a, user preferences, device capabilities, etc. The provisioning of the primary content item(s) 252a (and/or secondary content items) to the client 206a may adhere to one or more transport models/technologies. For example, in some embodiments a streaming transport mechanism may be utilized.

A primary content item 252a may include, or be associated with, one or more breaks in terms of a presentation of the primary content item 252a by the client 206a. For example, metadata (which may be included in a manifest transmitted by, e.g., the primary content server 202a) may identify points in time in a playback of the primary content item 252a where one or more secondary content items (e.g., advertisements) may be presented. Portions of the primary content item 252a may be allocated/designated as inventory that is made available for population in the primary content item 252a. The client 206a may identify the breaks in the presentation/playback of the primary content item 252a in accordance with the metadata and may generate and transmit, e.g., an advertisement request 256a to an advertisement platform 210a as shown in FIG. 2A.

The advertisement request 256a may be obtained by, e.g., a mediation component 214a of the advertisement platform 210a. The mediation component 214a may extract a key 260a that may be included as part of the advertisement request 256a. The key 260a may identify the client 206a, a vendor/service provider (e.g., service A 218a, service B 222a, service C 226a), or a combination thereof. As represented via service A' 218a' in FIG. 2A, a given service (e.g., a first service represented by a combination of service A 218a and service A' 218a') may be hosted by one or more devices or components. The mediation component 214a may provide (e.g., transmit) the key 260a to an advertisement ("ad") services component 230a.

In response to obtaining the key 260a, the ad services component 230a may identify services that may be provided to the client 206a in conjunction with a service list 264a. For example, the service list 264a may identify: a tier of service that is available to the client 206a (potentially in accordance with one or more subscriptions), one or more capabilities of the client 206a (e.g., a display capability [e.g., a display resolution], an audio capability, etc.), etc. The service list 264a may be provided by the ad services component 230a to, e.g., the mediation component 214a.

In accordance with obtaining the service list 264a, the mediation component 214a may generate and provide (e.g., transmit) a service request 268a to a service determination component 234a. As described in further detail below, the service determination component 234a may process the service request 268a, resulting in a processed service request. The processed service request may be provided (e.g., transmitted) to a particular vendor/service provider (e.g., service B 222a) or subset of vendors/service providers. In response to obtaining the processed service request, a vendor/service provider (service B 222a in this example) may return an advertisement to the service determination component 234a.

In response to obtaining the advertisement from the vendor/service provider, the service determination component 234a may provide (e.g., transmit) the advertisement to the mediation component 214a as part of an advertisement response 272a. As part of obtaining the advertisement from the service determination component 234a, the mediation component 214a may match the advertisement to the client identification portion of the key 260a in order to address and provide/deliver the advertisement response 272a to the client 206a.

In some embodiments, and as part of obtaining the advertisement from the service determination component 234a, the mediation component 214a may format the advertisement to adhere/conform to one or more parameters that may be specified/identified as part of the service list 264a. For example, the advertisement may be formatted to adhere/conform to a device capability and/or a preference of the client 206a (or a user associated therewith), resulting in a formatted advertisement that may be included in the advertisement response 272a provided by the mediation component 214a to the client 206a.

Based on obtaining the advertisement response 272a, the client 206a may insert/incorporate the (formatted) advertisement for playback during the break identified in the metadata as described above. In this manner, the system 200a may facilitate a dynamic selection and inclusion of an advertisement during a playback of a primary content item 252a by the client 206a, whereby the client 206a solicits/requests an advertisement (via the advertisement request 256a) and the advertisement platform 210a responds to the request 256a with an appropriately formatted and timely delivered advertisement (via the advertisement response 272a).

Figure 2B:
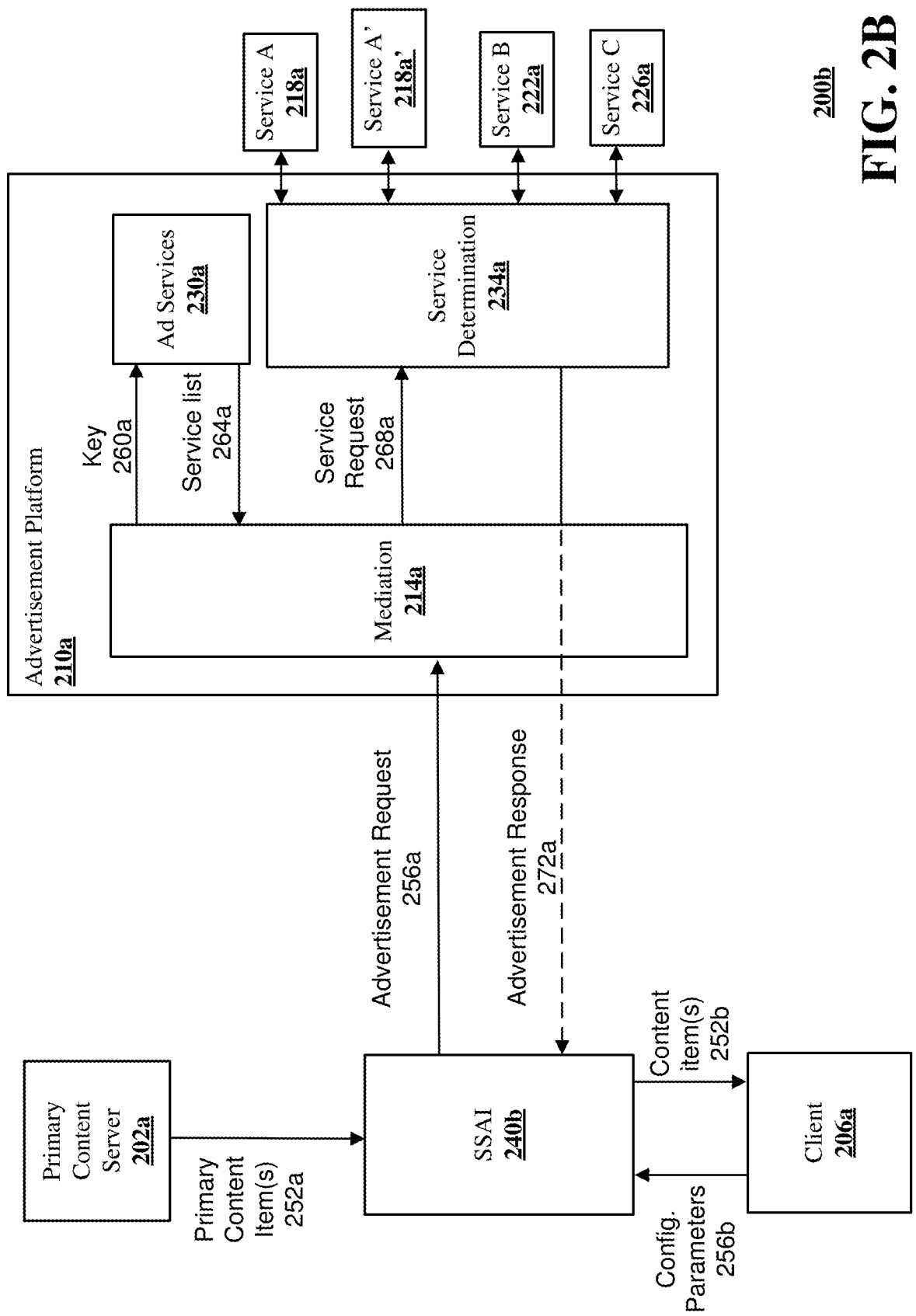

Referring now to FIG. 2B, a system 200b is shown. The system 200b may function within, or may be operatively overlaid upon, the communication network 100 of FIG. 1 in accordance with various aspects described herein. The system 200b may facilitate server-side advertisement insertion (SSAI) via an SSAI device/component 240b. While shown separately in FIG. 2B, in some embodiments the SSAI device 240b may be included/integrated as part of the advertisement platform 210a.

The SSAI device 240b may relieve the client 206a of a burden or obligation of having to analyze the metadata/manifest associated with the primary content item 252a to request a secondary content item (e.g., an advertisement). For example, the SSAI device 240b may identify the breaks in the presentation of the primary content item 252a (associated with the inventory) and may generate and provide the advertisement request 256a to the advertisement platform 210a (e.g., the mediation component 214a). The advertisement platform 210a of the system 200b may be operative upon the advertisement request 256a in a manner similar to that described above in relation to the system 200a in order to facilitate the generation and provisioning of the advertisement response 272a.

As part of the system 200b, the SSAI device 240b may obtain (e.g., receive) the advertisement response 272a and may insert/incorporate the (formatted) advertisement included as part of the advertisement response 272a into the primary content item 252a. Thus, content item(s) 252b that are provided by the SSAI device 240b to the client 206a may include the primary content item(s) 252a with any advertisements of the advertisement response 272a inserted at points coinciding with breaks within the primary content item(s) 252a.

In some embodiments, the client 206a may provide configuration parameters 256b to the SSAI device 240b to facilitate the client 206a obtaining the content item(s) 252b. For example, the parameters 256b may include a specification/identification of a particular vendor/service provider (or subset of vendors/service providers). The parameters 256b may include an identification of one or more user preferences/capabilities and/or one or more device preferences/capabilities. The parameters 256b may be dynamic in nature. For example, a vendor/service provider specified as part of the parameters 256b may be a function of the type/identity of the primary content item(s) 252a.

Figure 2C:
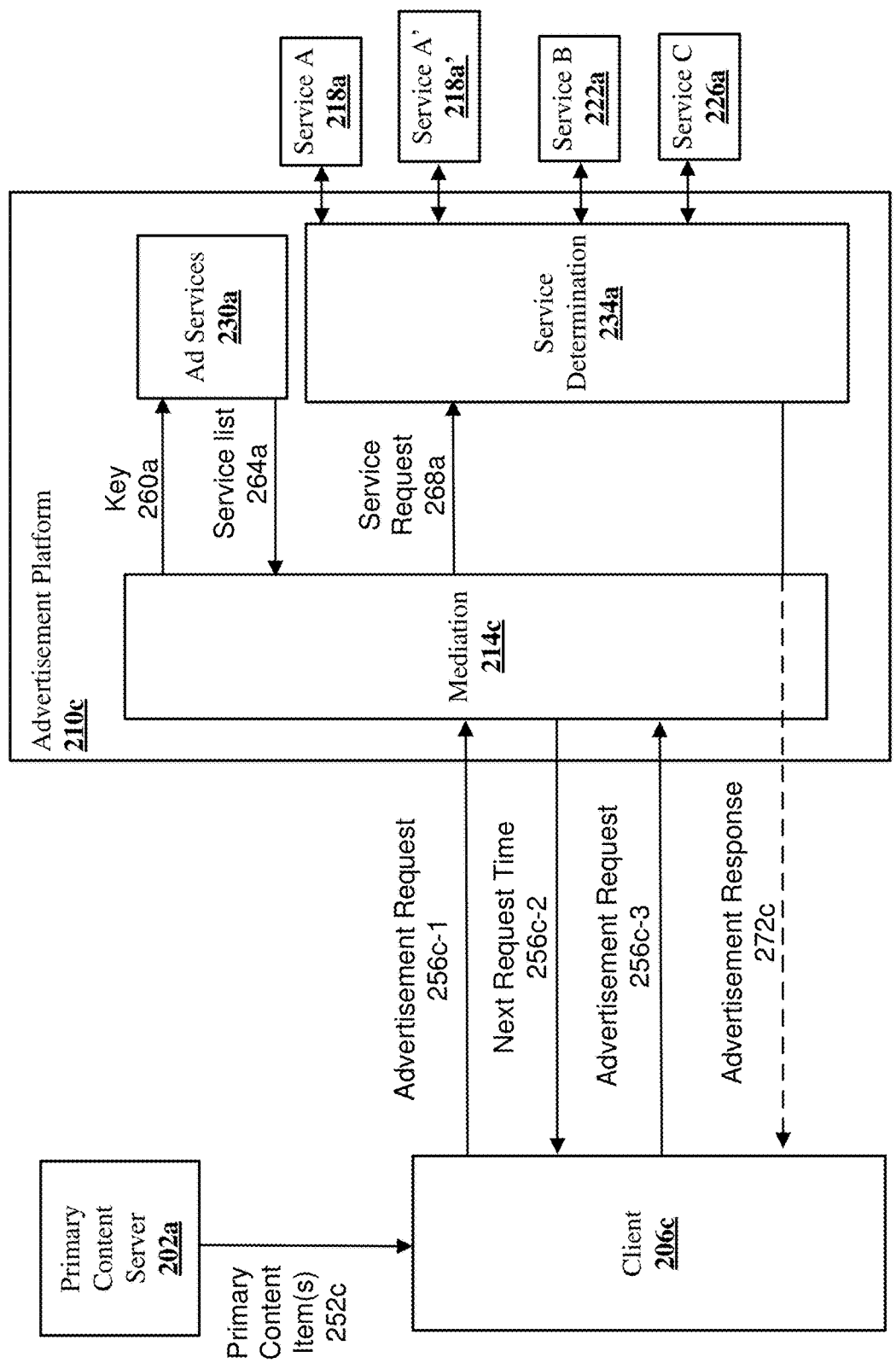

Referring now to FIG. 2C, a system 200c is shown. The system 200c may function within, or may be operatively overlaid upon, the communication network 100 of FIG. 1 in accordance with various aspects described herein. The system 200c may facilitate a replacement/substitution of a first advertisement included in one or more primary content item(s) 252c with one or more secondary advertisements. In particular, as shown in FIG. 2C a client 206c (which, in illustrative embodiments, may correspond to a smart television, a mobile device [e.g., a smartphone], etc.) may analyze metadata included with the primary content item(s) 252c to identify one or more advertisements included in the primary content item(s) 252c. Based on identifying an advertisement within a primary content item 252c, the client 206c may generate and provide (e.g., transmit) a first/initial advertisement request 256c-1 to an advertisement platform 210c (which may include aspects of the advertisement platform 210a of FIGS. 2A-2B).

In response to obtaining the initial advertisement request 256c-1, the advertisement platform 210c (e.g., a mediation component 214c, which may incorporate aspects of the mediation component 214a of FIG. 2A) may generate and provide an identification of a next request time 256c-2. The next request time 256c-2 may identify a time (on an absolute or relative basis) when the client 206c should again issue the initial advertisement request 256c-1 (as represented by the second advertisement request 256c-3).

The use of the next request time 256c-2 may provide the advertisement platform 210c with an ability to defer action on the initial advertisement request 256c-1, which may be useful in relation to balancing/managing load at the advertisement platform 210c. Additionally, such a deferral may enable/allow for a selection of a particular advertisement closer-in-time to when the advertisement is going to be presented by the client 206c, which may enhance a targeting/accuracy of (a selection of) the advertisement to particulars of the client 206c (or a user thereof)—to the extent that any additional information about the client 206c (or the user thereof) is obtained in the intervening period.

In response to the client providing the second advertisement request 256c-3 (e.g., at the time specified in the next request time 256c-2), the advertisement platform 210c may respond with an advertisement response 272c (which may incorporate aspects of the advertisement response 272a of FIGS. 2A-2B). The advertisement response 272c may include one or more advertisements (e.g., one or more formatted advertisements) that may replace one or more advertisements included in the primary content item(s) 252c. As an illustrative example, whereas the primary content item(s) 252c may include first advertisements that are based on a national level/scale, the advertisements included in the advertisement response 272c may support a localized or regional advertising campaign.

While the systems 200a, 200b, and 200c of FIGS. 2A-2C were described above separately for the sake of illustrative convenience, in some embodiments one or more aspects of (e.g., one or more of the operations performed by) a first of the systems (e.g., system 200a) may be combined with one or more aspects (e.g., operations) of one or more of the other systems (e.g., system 200b, system 200c). For example, in some embodiments a system may be configured to incorporate aspects of multiple ones of the systems 200a-200c, and may select a particular system configuration to use dynamically/on-the-fly/in (substantially) real-time in accordance with an occurrence of one or more identifiable events or conditions, in response to one or more inputs (e.g., user-generated inputs), etc. Additionally, one or more components and/or devices of the systems 200a-200c may be included within a common casing/enclosure/housing and/or may be distributed amongst a plurality of housings (potentially in conjunction with a multi-processor distributed computing environment). Aspects of the systems 200a-200c may adhere to various network topologies, such as for example a client-server architecture, a peer-to-peer network, a mesh network, etc.

Aspects of the systems 200a-200c may serve to break a one-to-one relationship that may have previously existed between a client and a vendor (or advertisement platform associated therewith) in conventional systems. For example, aspects of this disclosure may incorporate a so-called generic advertisement request (GAR) object to enable a client to potentially access advertisements associated with multiple vendors, without burdening the client with overhead associated with having to process information/data associated with the details of a particular vendor.

To demonstrate by way of an example, a GAR object may (illustratively) include three fields, referred to herein as: (1) a key, (2) a base object, and (3) an extension object. Each of the above-mentioned three fields may include parameters/sub-fields as described in further detail below.

As described above in relation to, e.g., the key 260a, a key of a GAR object may identify a particular client, a particular vendor/service provider, or a combination thereof. The key of the GAR object may be represented as, e.g., an alphanumeric string (e.g., 12345ABCDE), one or more symbols (e.g., !, @, #, $, %, etc.), etc., or any combination thereof.

On the basis of the key of the GAR object, an advertising platform (e.g., the service determination component 234a of the advertising platforms of FIGS. 2A-2C) may identify additional parameters, such as for example a Manage-Service (MS) parameter, a Yield-Optimization (YO) parameter, and an ad decision server (ADS) parameter. These parameters associated with the key of a GAR object are described in further detail below.

The MS parameter, which may be a Boolean parameter, may identify whether a service associated with a particular vendor is to be managed by an advertising platform. For example, if the MS parameter has a value of 'true', (an operator of) an advertising platform (e.g., an operator of the service determination component 234a of FIGS. 2A-2C) may dress an advertisement request with one or more additional parameters before sending the same to the vendor. If the MS parameter has a value of 'false', the advertising platform might not apply such additional parameters to the request sent to the vendor.

The YO parameter, which may be a Boolean parameter, may identify whether an advertising platform specifies additional parameters that may enhance or increase the efficiency or yield of advertisements provided to clients (or users of such clients). As an illustrative example, if the YO parameter has a value of 'true', (an operator of) an advertising platform may append an indication of a demographic characteristics, user profile characteristics, and/or other characteristics of client, or a user of a client, to an advertisement request before sending the same to a vendor. If the YO parameter has a value of 'false', the advertising platform might not apply such characteristics to the request sent to the vendor. Thus, aspects of the YO parameter may selectively facilitate targeted advertising in relation to a particular user (or subset of users), by enabling a selection of advertisements that are likely to be of interest/relevance to the user (or subset of users) in an amount greater than a threshold.

The ADS parameter may correspond to a string (e.g., an alphanumeric string, a symbols-based string, etc.) that may indicate a particular location to obtain an advertisement. Thus, the ADS parameter may facilitate directing an advertisement request to a particular address in accordance with one or more addressing schemes. Aspects of the ADS parameter may adhere/conform to the hyper text transport protocol (HTTP), a uniform resource locator (URL), and the like.

By way of example, a base object of a GAR object may include one or more of the following parameters: (1) a network identifier, (2) an application identifier, (3) a session identifier, (4) a platform identifier, (5) an address identifier (e.g., an IP address), (6) location coordinates, (7) an advertising type, (8) a stream identifier, and (9) call back time parameter. These parameters of the illustrative base object of a GAR object are described in further detail below.

Collectively, the first five parameters of the above-mentioned base object (namely: (1) the network identifier, (2) the application identifier, (3) the session identifier, (4) the platform identifier, and (5) the address identifier) may serve to identify a source or origin of an advertisement request. For example, the network identifier may identify one or more networks from which the advertisement request originates. The application identifier may identify one or more applications from which the advertisement request originates. The session identifier may identify one or more sessions (e.g., communication sessions) from which the advertisement request originates. The platform identifier may identify a type or kind of platform that a client device is utilizing; in some embodiments, the platform identifier may correspond to a make and/or model of a particular client. The address identifier may correspond to an address that uniquely identifies the client within the network(s). Aspects of these first five parameters of the base object may facilitate an addressable space, whereby advertisements and/or advertisement responses (see, e.g., FIG. 2C: advertisement response 272c) are routed to an appropriate client. Furthermore, aspects of the first five parameters of the base object may facilitate billing/invoicing, transaction validation/verification (or, analogously, fraud prevention), etc. For example, these parameters of the base object may be utilized to create a log/record of: when advertisement requests were received, from which client the advertisement request originated, what vendor/service provider was selected to fulfill a particular advertisement request, and what was the content/creative that was selected to fulfill the advertisement request.

The location coordinates parameter of the base object may identify a location where the client is situated/positioned. In some embodiments, the location may be specified by a latitude coordinate and a longitude coordinate corresponding/relative to a position on the Earth's surface. Knowledge of the client's location may be used in connection with location-based advertising. To demonstrate, and assuming all other conditions being equal, if the client is located in San Francisco a San Francisco-themed advertisement may be selected for provisioning to the client, whereas if the client is located in New York a New York-themed advertisement may be selected for provisioning to the client.

The advertising type parameter of the base object may identify how content (e.g., primary content items and/or secondary content items) are being provided to the client. For example, the advertising type parameter may identify content as being distributed linearly, via video on demand (VOD), etc. The advertising type parameter may represent a constraint on the types of candidate advertisements that may be provisioned to the client.

The stream identifier parameter of the base object may identify a stream that is used to deliver content to a client. For example, in connection with the SSAI device 240b of the system 200b, the content items 252b may be provided to the client 206a via a uniquely identifiable stream. In this manner, an advertisement included within, e.g., an advertisement response (see, e.g., advertisement response 272a in FIG. 2B) may be matched/inserted into the stream of the content (e.g., content items 252b of FIG. 2B) provided to the client.

The call back time parameter of the base object, which may be a Boolean parameter, may specify whether the client requests an indication of a time to call back or re-initiate a request for an advertisement (see, e.g., advertisement request 256c-3 of FIG. 2C). For example, if the call back time parameter is set to 'true' then the advertisement platform may respond with an indication of a time when to re-initiate a request for an advertisement (see, e.g., next request time 256c-2 of FIG. 2C). Conversely, if the call back time parameter is set to 'false' then the client might not want, or expect, an indication of a time when to re-initiate a request for an advertisement.

An extension object of a GAR object may include: (1) an ADS parameter [if, for example, the advertising platform does not derive the ADS from the key], and (2) one or more pass-through attributes. The pass-through attributes, which may be transmitted by the client, may include one or more parameters that may be needed/utilized by the vendor/service provider identified by the key. Stated slightly differently, and as the nomenclature implies, an advertising platform may transfer the pass-through attributes of the extension object in an unadulterated form from the client to the vendor/service provider as a courtesy to the vendor/service provider.

Figure 2D:
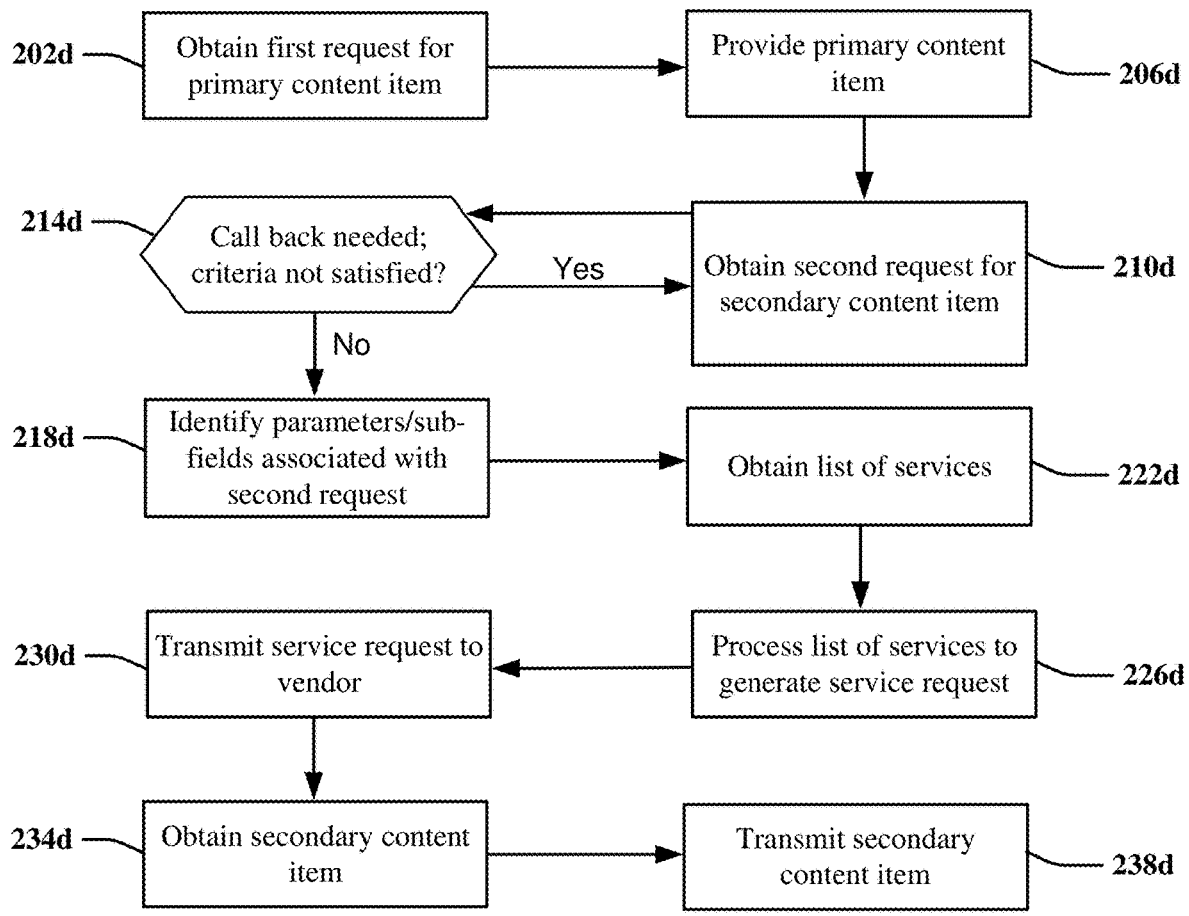
FIG. 2D depicts an illustrative embodiment of a method in accordance with various aspects described herein.

Referring now to FIG. 2D, an illustrative embodiment of a method 200d in accordance with various aspects described herein is shown. Method 200d may be partially or wholly executed by and/or in conjunction with one or more systems, devices, and/or components, such as for example one or more of the systems, devices, and/or components described herein. As described in further detail below, the method 200d may be executed to fulfill one or more requests in relation to a secondary content item (e.g., an advertisement) in support of a playback of one or more primary content items.

In block 202d, a first request for a primary content item may be obtained. For example, the first request may relate to a video, a document, an audio track, etc. The first request of block 202d may be obtained from one or more applications, devices, etc.

In block 206d, the primary content item may be provided (e.g., transmitted) to the entity that submitted the first request of block 202d, or to any other entity as appropriate/warranted.

In block 210d, a second request for one or more secondary content items may be obtained. The second request may be obtained based on an analysis of (metadata of) the primary content item to identify a break in the primary content item.

In block 214d, a determination may be made regarding whether a call back is needed, and if so, whether call back criteria (e.g., a call back time) has been satisfied. If a call back is needed, and the criteria has not been satisfied, flow may proceed from block 214*d* to block 210*d* until the criteria has been satisfied. In this regard, a loop may be established between block 210*d* and block 214*d*, enabling the second request (or another request associated with the second request) to be resubmitted. On the other hand, if a call back is not needed, or the call back criteria has been satisfied, flow may proceed from block 214*d* to block 218*d*.

In block 218*d*, one or more sub-fields and/or parameters associated with the second request may be identified. For example, one or more sub-fields/parameters of a GAR object may be identified as part of block 218*d*.

In block 222*d*, a list of services may be obtained. The list of services may be based at least in part on an identification of a client, a vendor, or a combination thereof.

In block 226*d*, the list of services of block 222*d* may be processed to generate a service request. The processing of block 226*d* may be based at least in part on the parameters/sub-fields identified as part of block 218*d*.

In block 230*d*, the service request of block 226*d* may be provided (e.g., transmitted) to a vendor. For example, as part of block 230*d* the service request may be provided to a device (e.g., a server) of the vendor. The device of the vendor may be identified in the service request, where an identification of the device of the vendor may be obtained in conjunction with block 218*d*.

In block 234*d*, a secondary content item may be obtained (e.g., received) from the vendor in response to the providing of the service request in block 230*d*.

In block 238*d*, the secondary content item obtained in block 234*d* may be provided (e.g., transmitted). For example, the secondary content item may be provided to a client device (or an application of the client device), an SSAI device, or any other device or application as appropriate/warranted under the circumstances.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In accordance with aspects of this disclosure, content providers (CPs) and multi-video program distributors (MVPDs) may enter into agreements with third-party dynamic advertising technology (ad tech) companies to manage their inventory. As one skilled in the art will appreciate, inventory may correspond to locations (e.g., slots) within primary content items (e.g., media content) where advertisements/commercials are placed in an ad-supported revenue model. The third-party ad tech companies may provide services to manage the inventory, subscriber information, and campaigns, which include parameters such as frequency of management and yield optimization. The third-party ad tech companies may utilize aspects of this disclosure to facilitate the provisioning of such services.

As a result of utilizing aspects of this disclosure, CPs and MVPDs may be able to select services across a variety of providers. As a result, CPs and MVPDs may effectively reduce their risk of exposure by not being dependent on a singular ad tech provider. Stated slightly differently, aspects of this disclosure may enable CPs and MVPDs to migrate/move from a first ad tech provider to another/second ad tech provider without having to incur massive/large changes to their content distribution chain/technology.

Aspects of the disclosure may utilize a GAR object that is highly modular to promote efficiencies in use, yet flexible/customizable to cater to specific requirements (e.g., specific client and/or vendor requirements). As described above, a GAR object may include a key that may be used to unlock/grant access to a number of parameters/sub-fields that help to facilitate a fulfillment of an advertisement request. In particular, parameters/sub-fields of a GAR object may enable an advertising platform to transpose/transform an advertisement request that may originate from any number or type of client into a format (e.g., a proprietary format) required by a particular vendor. Various parameters/sub-fields of a GAR object may be provided (e.g., transmitted) by a client and/or may be stored by an advertising platform.

Aspects of this disclosure may be combined with other disclosures for any purpose, express or implied, as stated herein or in such other disclosures. To demonstrate, aspects of this disclosure may incorporate aspects of a bidding model to enhance/increase revenue, profits, return on investment (ROI), or the like, in connection with a provisioning of one or more advertisements. U.S. patent application publication number 2017/0127123, the contents of which are fully incorporated herein by way of reference, sets forth various exemplary embodiments regarding the use of various bidding models.

Various exemplary embodiments described herein pertain to a selection and/or an insertion of an advertisement as part of a provisioning of primary content items to a client. The advertisement may be associated with a product and/or a service of a sponsoring party/entity. In some embodiments, an advertisement that is provided may include a selectable link that, when selected, may launch a website or webpage that may provide an ability for a client (e.g., a client application, a client device, etc.) to purchase the product and/or the service. In some embodiments, the advertisement may pertain to yet another content item, which is say that a (reference to a) secondary content item may be embedded or included within a primary content item. As an illustrative example, an online news article may represent a primary content item, and within a portion of the news article there may be reserved space for a promotional clip/trailer of a movie that is available for download or purchase.

While some of the exemplary embodiments set forth above described returning an advertisement to, e.g., an SSAI device and/or a client as part of an advertisement response, in some embodiments a reference (e.g., a pointer, a link, an address, an identifier, etc.) to a location (e.g., a storage location, such as a content server, a database, a repository, etc.) where the advertisement may be obtained may be included as part of the advertisement response. In this respect, one or more devices and/or components (e.g., a client device or application, an SSAI, etc.) may access the reference to the location and obtain the advertisement in accordance with the reference. The one or more devices and/or components may format the advertisement, as needed, to facilitate a playback of the advertisement by the client.

In some embodiments, devices (e.g., televisions, communication devices, displays, monitors, etc.) may be fabricated/manufactured to support one or more aspects of this disclosure. Thus, consumers/purchasers of such devices may be able to readily utilize aspects of this disclosure "off the shelf". In some embodiments, functionality may be installed (e.g., downloaded) on a device after the device has been manufactured. For example, one or more software packages (e.g., patches) may be installed on a device via a connection to one or more devices, potentially over one or more networks.

Aspects of this disclosure may be used to bridge gaps that might otherwise be present between CPs, MVPDs, advertisers, and equipment manufacturers in connection with addressable advertising. In some embodiments, one or more wrappers, plug-ins, kits (e.g., a software development kit [SDK]), or the like, may be utilized to format data or information for use by a recipient of the data/information. In some embodiments, metadata may be used to supplement the data and provide a target recipient or device with instructions on how to process the data.

Aspects of the disclosure may combine written instructions/specifications with hardware, software, firmware (or any combination thereof) implementations to achieve/obtain the functionality described herein. Aspects of this disclosure may include connectivity to facilitate routing services (e.g., advertisement routing service), with formatted decision requests and/or responses and management/control functionality. Advertising campaigns and decisions may be facilitated by an identification of one or more audiences (potentially in accordance with one or more segments), with commensurate metrics and reporting being made available. An audience segment may be identified in accordance with one or more criteria, such as for example user demographic characteristic (e.g., sex, age, race, religion, income-level, etc.), content or advertisement origin identifiers, communication device or application capabilities, etc.

As described above, aspects of the disclosure may facilitate a generation of metrics and reporting. Documentation may be generated in accordance therewith to support invoicing/billing, customer relationship management activities, etc., based on a provisioning of an advertisement.

Aspects of the disclosure may facilitate a variety of inventory types and content distribution models, such as for example linear, live, on-demand, interactive, etc. In some embodiments, content (e.g., advertisements) may be distributed in connection with a digital domain or representation, potentially as part of one or more banners or the like. In some embodiments, inventory may be allocated on a scheduled basis, an addressable basis, on a programmatic or program-driven basis, etc. Aspects of the disclosure may facilitate advertisement selection and/or insertion on a hard-interconnect basis, on-the-fly (e.g., in real-time), etc.

Aspects of the disclosure may provide support for advertisement content onboarding, hosting, transcoding, and security (e.g., rights management). In some embodiments, one or more forecasts or predictions may be generated to enhance the accuracy of an advertisement (or an associated campaign) in terms of reaching a target audience (or segment thereof).

Aspects of the disclosure may link subscribers/consumers of content (e.g., media) with suppliers/vendors of advertisements. In some embodiments, sales operations/personnel may obtain insight into additional advertising opportunities that might otherwise have gone unidentified in the absence of this disclosure. In this respect, aspects of the disclosure may enhance or increase the effectiveness or efficiency of a given advertisement.

In some embodiments, advertisement decision requests and/or responses may be handled by an advertisement routing services (ARS) device (which may incorporate aspects of one or more of the devices and/or platforms described herein). In some embodiments, requests and/or responses may be based at least in part on one or more triggers, such as for example one or more markers, watermarks, etc., associated with an advertisement or a content item, a change in device status (e.g., a device powering-on, a change in an entertainment channel that is selected, etc.), etc.

In some embodiments, one or more: devices, network traffic, advertising campaigns, inventory, subscriber data, network functions, and content may be managed, potentially in accordance with one or more relationships (e.g., client or subscriber-facing relationships).

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of: system 100, systems 200a-200c, and/or method 200d presented in FIGS. 1 and 2A-2D. For example, virtualized communication network 300 can facilitate in whole or in part obtaining a first request that includes a key, identifying, in accordance with the key, a client associated with the first request and a vendor associated with the first request, obtaining a list of services associated with the client, the vendor, or a combination thereof, processing the list of services to generate a service request, transmitting the service request to a server of the vendor, responsive to the transmitting of the service request, obtaining information pertaining to an advertisement, and responsive to the obtaining of the information, transmitting the information. Virtualized communication network 300 can facilitate in whole or in part transmitting a first request that includes a key, wherein the key identifies: a processing system that is a targeted recipient of an advertisement, a stream in which a primary content item is being provisioned to the processing system, and a service provider, based at least in part on the transmitting of the first request, obtaining information pertaining to an advertisement from a device of the service provider, and inserting the information within a portion of the stream corresponding to a break in the primary content item. Virtualized communication network 300 can facilitate in whole or in part transmitting a first request that identifies a video, receiving a first portion of the video from a first server via a streaming transport mechanism, presenting the first portion of the video via a display screen and a speaker, identifying a break in a playback of the video between the first portion of the video and a second portion of the video that is subsequent to the first portion in the playback, transmitting a second request that includes a first identification of the processing system and a second identification of a vendor, responsive to the transmitting of the second request, receiving information pertaining to an advertisement prior to the break, obtaining the advertisement in accordance with the information, and presenting the advertisement via the display screen and the speaker at a point in time in the playback corresponding to the break.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
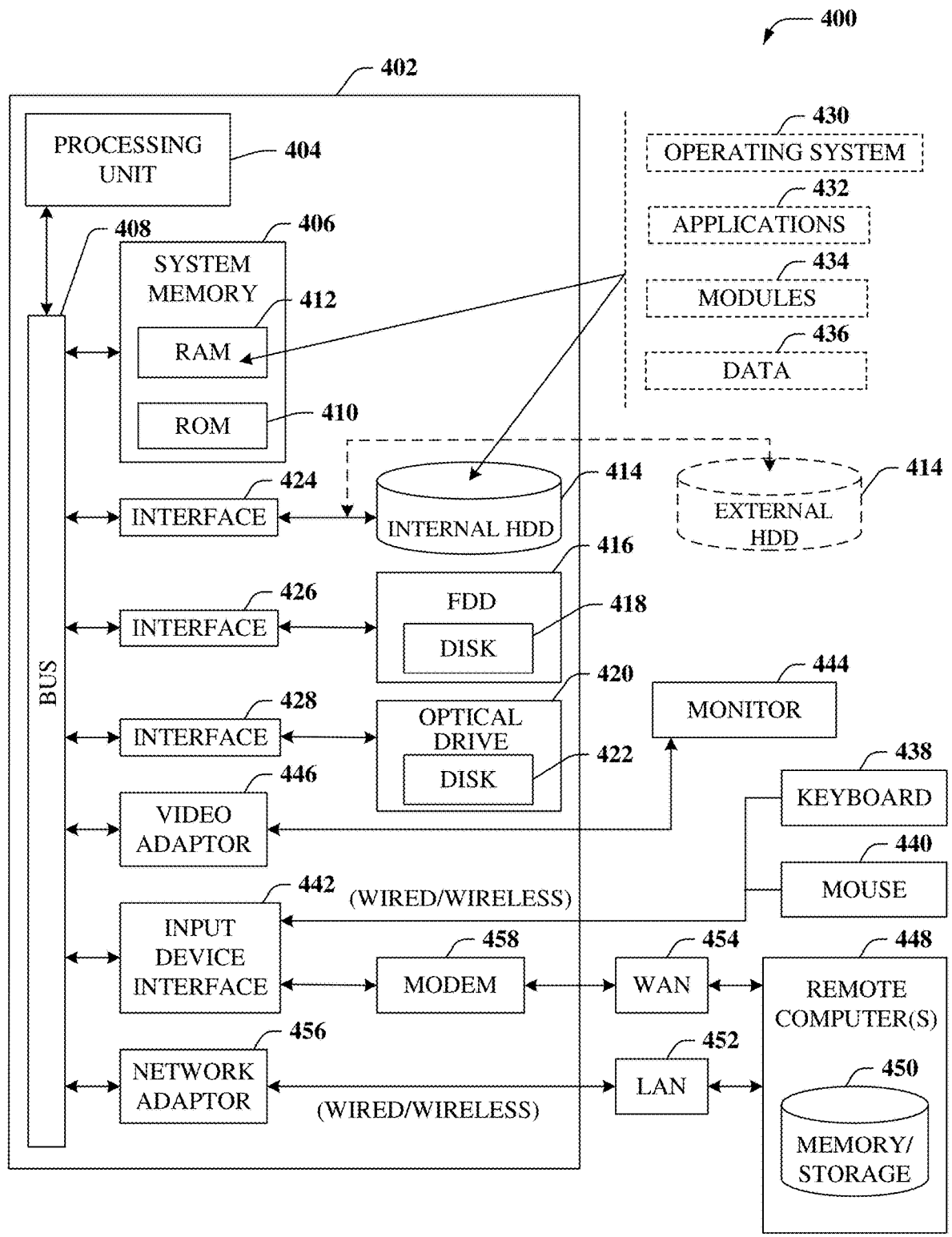
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a first request that includes a key, identifying, in accordance with the key, a client associated with the first request and a vendor associated with the first request, obtaining a list of services associated with the client, the vendor, or a combination thereof, processing the list of services to generate a service request, transmitting the service request to a server of the vendor, responsive to the transmitting of the service request, obtaining information pertaining to an advertisement, and responsive to the obtaining of the information, transmitting the information. Computing environment 400 can facilitate in whole or in part transmitting a first request that includes a key, wherein the key identifies: a processing system that is a targeted recipient of an advertisement, a stream in which a primary content item is being provisioned to the processing system, and a service provider, based at least in part on the transmitting of the first request, obtaining information pertaining to an advertisement from a device of the service provider, and inserting the information within a portion of the stream corresponding to a break in the primary content item. Computing environment 400 can facilitate in whole or in part transmitting a first request that identifies a video, receiving a first portion of the video from a first server via a streaming transport mechanism, presenting the first portion of the video via a display screen and a speaker, identifying a break in a playback of the video between the first portion of the video and a second portion of the video that is subsequent to the first portion in the playback, transmitting a second request that includes a first identification of the processing system and a second identification of a vendor, responsive to the transmitting of the second request, receiving information pertaining to an advertisement prior to the break, obtaining the advertisement in accordance with the information, and presenting the advertisement via the display screen and the speaker at a point in time in the playback corresponding to the break.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
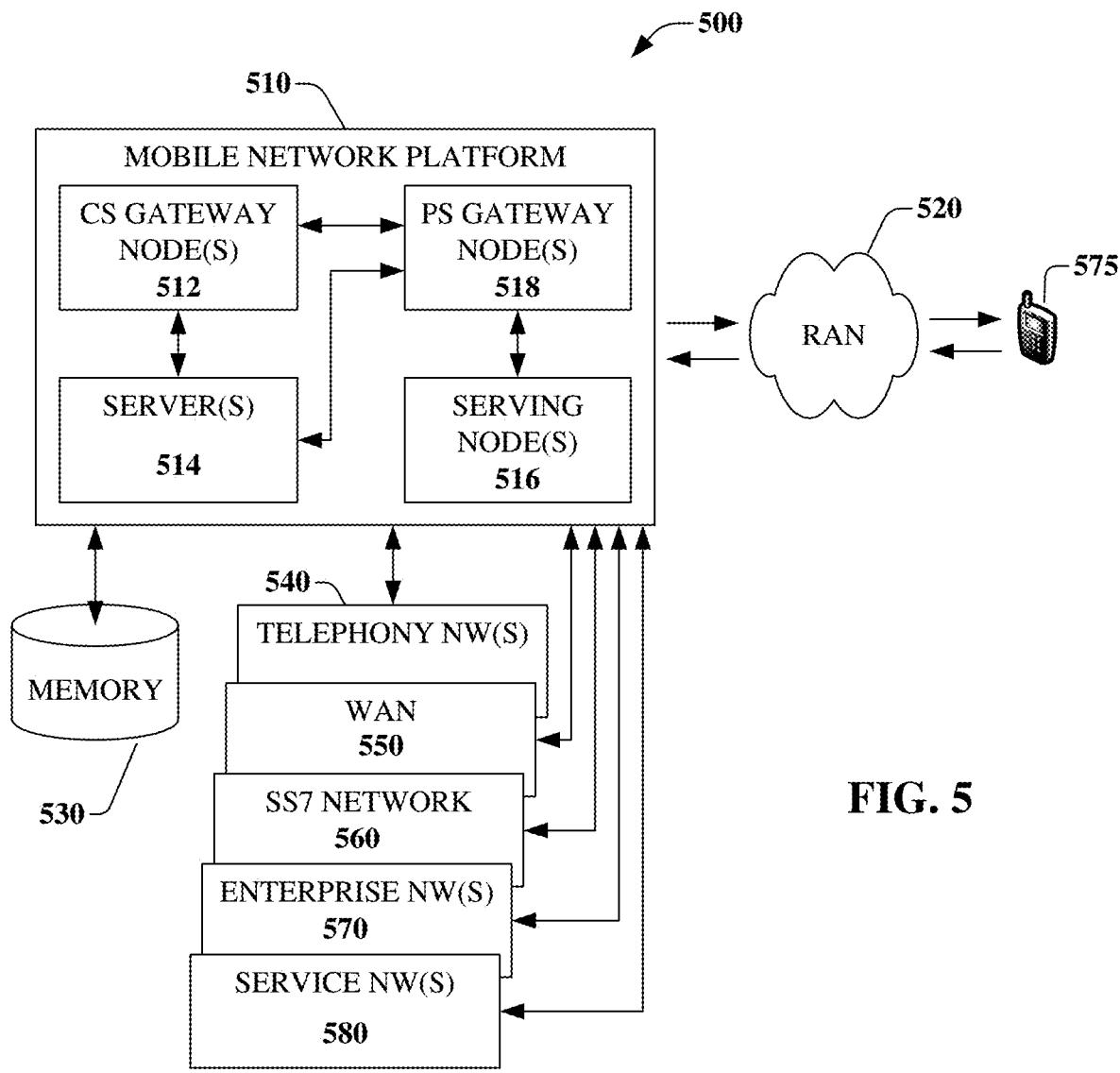
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a first request that includes a key, identifying, in accordance with the key, a client associated with the first request and a vendor associated with the first request, obtaining a list of services associated with the client, the vendor, or a combination thereof, processing the list of services to generate a service request, transmitting the service request to a server of the vendor, responsive to the transmitting of the service request, obtaining information pertaining to an advertisement, and responsive to the obtaining of the information, transmitting the information. Platform 510 can facilitate in whole or in part transmitting a first request that includes a key, wherein the key identifies: a processing system that is a targeted recipient of an advertisement, a stream in which a primary content item is being provisioned to the processing system, and a service provider, based at least in part on the transmitting of the first request, obtaining information pertaining to an advertisement from a device of the service provider, and inserting the information within a portion of the stream corresponding to a break in the primary content item. Platform 510 can facilitate in whole or in part transmitting a first request that identifies a video, receiving a first portion of the video from a first server via a streaming transport mechanism, presenting the first portion of the video via a display screen and a speaker, identifying a break in a playback of the video between the first portion of the video and a second portion of the video that is subsequent to the first portion in the playback, transmitting a second request that includes a first identification of the processing system and a second identification of a vendor, responsive to the transmitting of the second request, receiving information pertaining to an advertisement prior to the break, obtaining the advertisement in accordance with the information, and presenting the advertisement via the display screen and the speaker at a point in time in the playback corresponding to the break.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
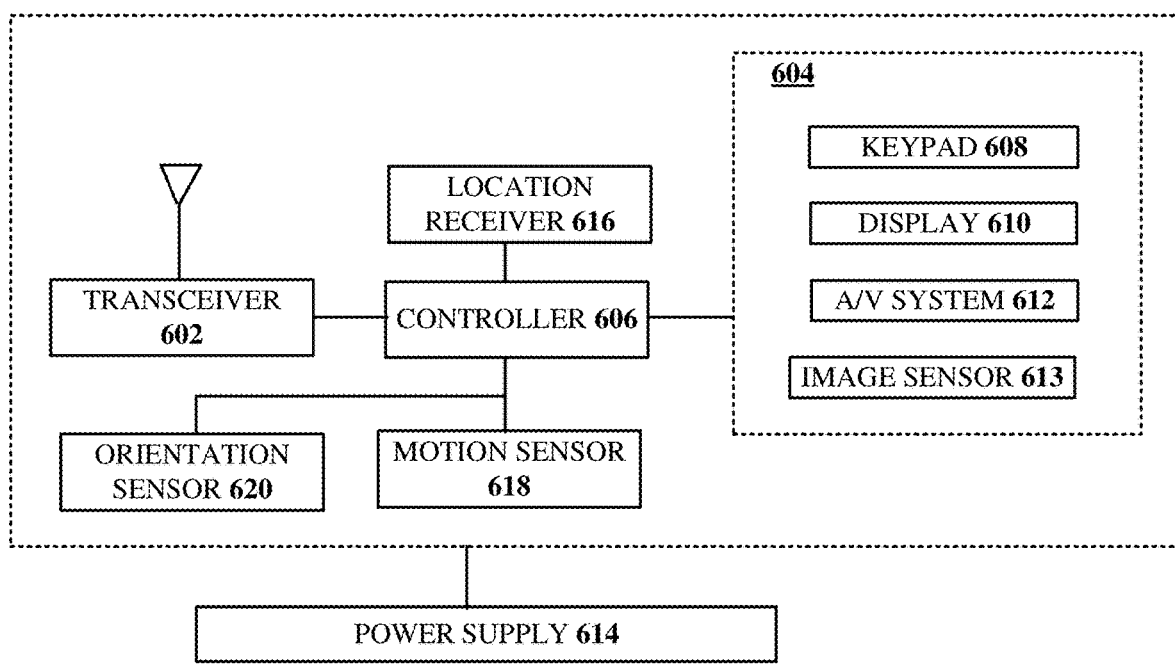
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a first request that includes a key, identifying, in accordance with the key, a client associated with the first request and a vendor associated with the first request, obtaining a list of services associated with the client, the vendor, or a combination thereof, processing the list of services to generate a service request, transmitting the service request to a server of the vendor, responsive to the transmitting of the service request, obtaining information pertaining to an advertisement, and responsive to the obtaining of the information, transmitting the information. Computing device 600 can facilitate in whole or in part transmitting a first request that includes a key, wherein the key identifies: a processing system that is a targeted recipient of an advertisement, a stream in which a primary content item is being provisioned to the processing system, and a service provider, based at least in part on the transmitting of the first request, obtaining information pertaining to an advertisement from a device of the service provider, and inserting the information within a portion of the stream corresponding to a break in the primary content item. Computing device 600 can facilitate in whole or in part transmitting a first request that identifies a video, receiving a first portion of the video from a first server via a streaming transport mechanism, presenting the first portion of the video via a display screen and a speaker, identifying a break in a playback of the video between the first portion of the video and a second portion of the video that is subsequent to the first portion in the playback, transmitting a second request that includes a first identification of the processing system and a second identification of a vendor, responsive to the transmitting of the second request, receiving information pertaining to an advertisement prior to the break, obtaining the advertisement in accordance with the information, and presenting the advertisement via the display screen and the speaker at a point in time in the playback corresponding to the break.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining a first request that includes a parameter identifying whether or not a call back time is to be provided, wherein the call back time represents a time at or after which the first request can be resubmitted as a second request;
identifying a client associated with the first request and a vendor associated with the first request;
obtaining a list of services associated with the client, the vendor, or a combination thereof;
processing the list of services to generate a service request;
transmitting the service request to a server of the vendor;
responsive to the transmitting of the service request, obtaining information pertaining to an advertisement; and
responsive to the obtaining of the information, transmitting the information.

2. The device of claim 1, wherein the operations further comprise:
in response to the parameter indicating that the call back time is to be provided, identifying a point in time in a playback of a primary content item at the client corresponding to a break between portions of content and transmitting the identification of the call back time.

3. The device of claim 1, wherein the obtaining of the first request comprises obtaining the first request from the client.

4. The device of claim 3, wherein the transmitting of the information comprises transmitting the information to the client to fulfill the second request.

5. The device of claim 1, wherein the obtaining of the first request comprises obtaining the first request from a second device that excludes the client.

6. The device of claim 5, wherein the transmitting of the information comprises transmitting the information to the second device to fulfill the second request.

7. The device of claim 6, wherein the transmitting of the information to the second device causes the second device to transmit the information to the client.

8. The device of claim 1, wherein the operations further comprise:
dressing the service request with one or more additional parameters,
wherein the transmitting of the service request comprises transmitting the one or more additional parameters in accordance with the dressing.

9. The device of claim 1, wherein the operations further comprise:
identifying one or more parameters associated with a yield optimization,
wherein the transmitting of the service request comprises transmitting the one or more parameters.

10. The device of claim 1, wherein the operations further comprise:
identifying, in accordance with a key, the server of the vendor,
wherein the transmitting of the service request is in accordance with the identifying of the server.

11. The device of claim 1, wherein the first request further includes a network identifier, a session identifier, a platform identifier, and an address, and wherein the service request is based on the network identifier, the session identifier, the platform identifier, and the address.

12. The device of claim 1, wherein the first request further includes a location of the client in terms of at least latitude and longitude, and wherein the service request is based on the location of the client.

13. The device of claim 1, wherein the first request further includes a parameter that identifies that a primary content item is being provisioned to the client in accordance with a linear distribution model, a video on demand distribution model, or a combination thereof, and wherein the service request is based on the parameter.

14. The device of claim 1, wherein the first request further includes a plurality of parameters that are utilized by the server of the vendor.

15. A non-transitory machine-readable medium, comprising executable instructions that, when executed by a processing system including a processor, facilitate performance of operations, the operations comprising:
obtaining a first request that includes a parameter identifying whether or not a call back time is to be provided, wherein the call back time represents a time at or after which the first request can be resubmitted as a second request;
identifying a client associated with the first request and a vendor associated with the first request;
obtaining a service request;
transmitting the service request to a server of a vendor;

responsive to the transmitting of the service request, obtaining information pertaining to an advertisement; and responsive to the obtaining of the information, transmitting the information, wherein the information includes a selectable link that enables an order or purchase to be placed for a product or a service associated with the advertisement.

16. The non-transitory machine-readable medium of claim 15, wherein the operations further comprise:

obtaining a list of services associated with the client, the vendor, or a combination thereof;

processing the list of services to generate the service request, wherein the information includes the advertisement or a reference to a location where the advertisement is stored; and in response to the parameter indicating that the call back time is to be provided, identifying a point in time in a playback of a primary content item at the client corresponding to a break between portions of content and transmitting the identification of the call back time.

17. The non-transitory machine-readable medium of claim 15, wherein the first request further includes a network identifier, a session identifier, a platform identifier, and an address.

18. The non-transitory machine-readable medium of claim 15, wherein the first request further includes a location of the processing system in terms of at least latitude and longitude.

19. The non-transitory machine-readable medium of claim 15, wherein the first request further includes a parameter that identifies that a primary content item is being provisioned to the processing system in accordance with a linear distribution model, a video on demand distribution model, or a combination thereof.

20. A method, comprising:

obtaining, by a processing system including a processor, a first request that includes a parameter identifying whether or not a call back time is to be provided, wherein the call back time represents a time at or after which the first request can be resubmitted as a second request;

identifying, by the processing system, a client associated with the first request and a vendor associated with the first request;

obtaining, by the processing system, a list of services associated with the client, the vendor, or a combination thereof;

processing, by the processing system, the list of services to generate a service request;

transmitting, by the processing system, the service request to a server of the vendor;

responsive to the transmitting of the service request, obtaining, by the processing system, information pertaining to an advertisement; and responsive to the obtaining of the information, transmitting, by the processing system, the information.

* * * * *